Figure 1:
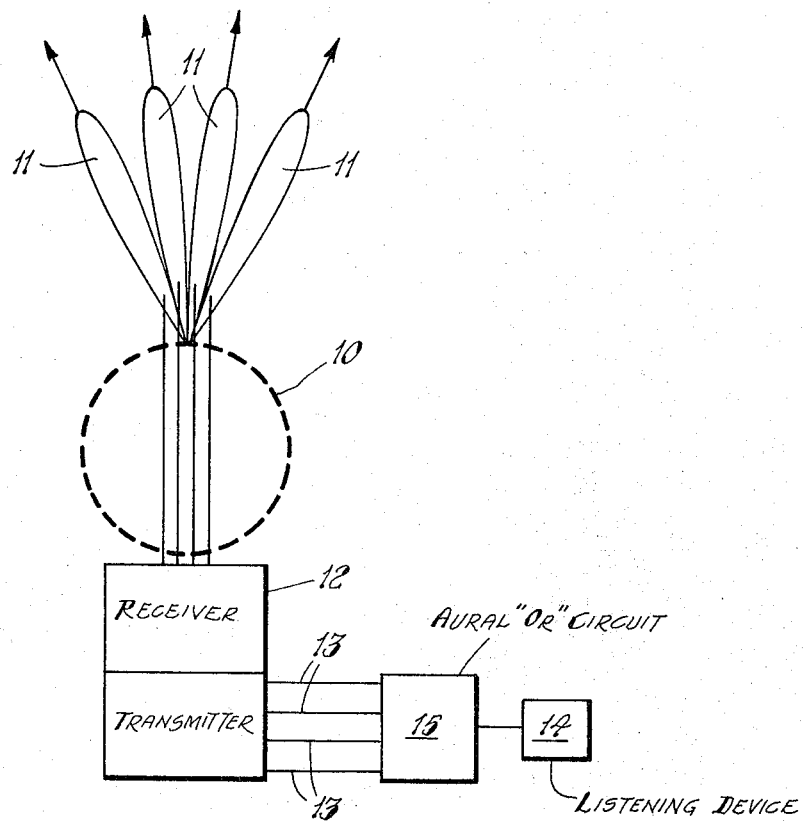

INVENTOR.
FRANK S. WHITE JR.

United States Patent Office 3,286,186
Patented Nov. 15, 1966

3,286,186
SONAR SYSTEM AURAL "OR" CIRCUIT
Frank S. White, Jr., Mystic, Conn., assignor to the United States of America as represented by the Secretary of the Navy
Filed June 8, 1964, Ser. No. 374,237
3 Claims. (Cl. 328—137)

The invention described herein may be manufactured and used by or for the Government of the United States of America for governmental purposes without the payment of any royalties thereon or therefor.

This invention relates to sonar listening systems and more particularly to a circuit enabling an operator to simultaneously monitor a plurality of inputs with an increased Doppler discrimination and scan rate.

Echo ranging or target detection sonar systems generally involved the transmission of ultrasonic pulses and the receiving of echoes from distant targets. Through the use of highly directive transducers (and hydrophones) and observation of the transit time both bearing and range of a target can be ascertained. Where, however, reverberation and low signal-to-noise are encountered it becomes difficult to recognize a target. If the target is in motion an added factor may be employed, namely, the Doppler effect.

In order to search a larger area in a shorter interval, it is customary to simultaneously transmit a plurality of pulses in different direction and then observe the returned echoes. Present systems, for example, which transmit four simultaneous pulses, and in order to provide a means of listening to them modulate two of the pulses at one audio frequency and the other two at some different frequency. By applying two of the different frequency signals received to one earphone and the other two to the other phone, a listener can generally discriminate between frequency changes (Doppler) and thereby recognize a moving target on any of the beams. This system is referred to as frequency multiplexing and theoretically the operator should be able to monitor many frequency bands without the signals in any one band appreciably interfering with the signals in any of the others. This, however, is not always the case since some operators indicate that certain tones are quite annoying and therefore limits the operator's ability to detect Doppler. The presently employed arrangement does not present reverberations (unwanted echoes) as simple tones (very narrow band signals) so the operators have no ready references against which to compare the pitch of the potential target echoes. They feel that, as sonar operators, they are being deprived of a major source of information which is necessary in deciding whether a particular echo is a target. Present equipment does not provide the listening operator with a reverberation background which has about an 800 cycle tone.

In view of the foregoing it is an object of this invention to provide circuitry enabling a sonar operator to quickly and accurately detect a moving target employing multipulse form of transmission.

It is a further object to provide a simple inexpensive, accurate device for use with present active sonar systems which will enhance a listening operator's ability to detect a moving target through Doppler and increase his scanning rate.

Other objects and advantages will appear from the following description of an example of the invention, and the novel features will be particularly pointed out in the appended claims.

Figure 2:
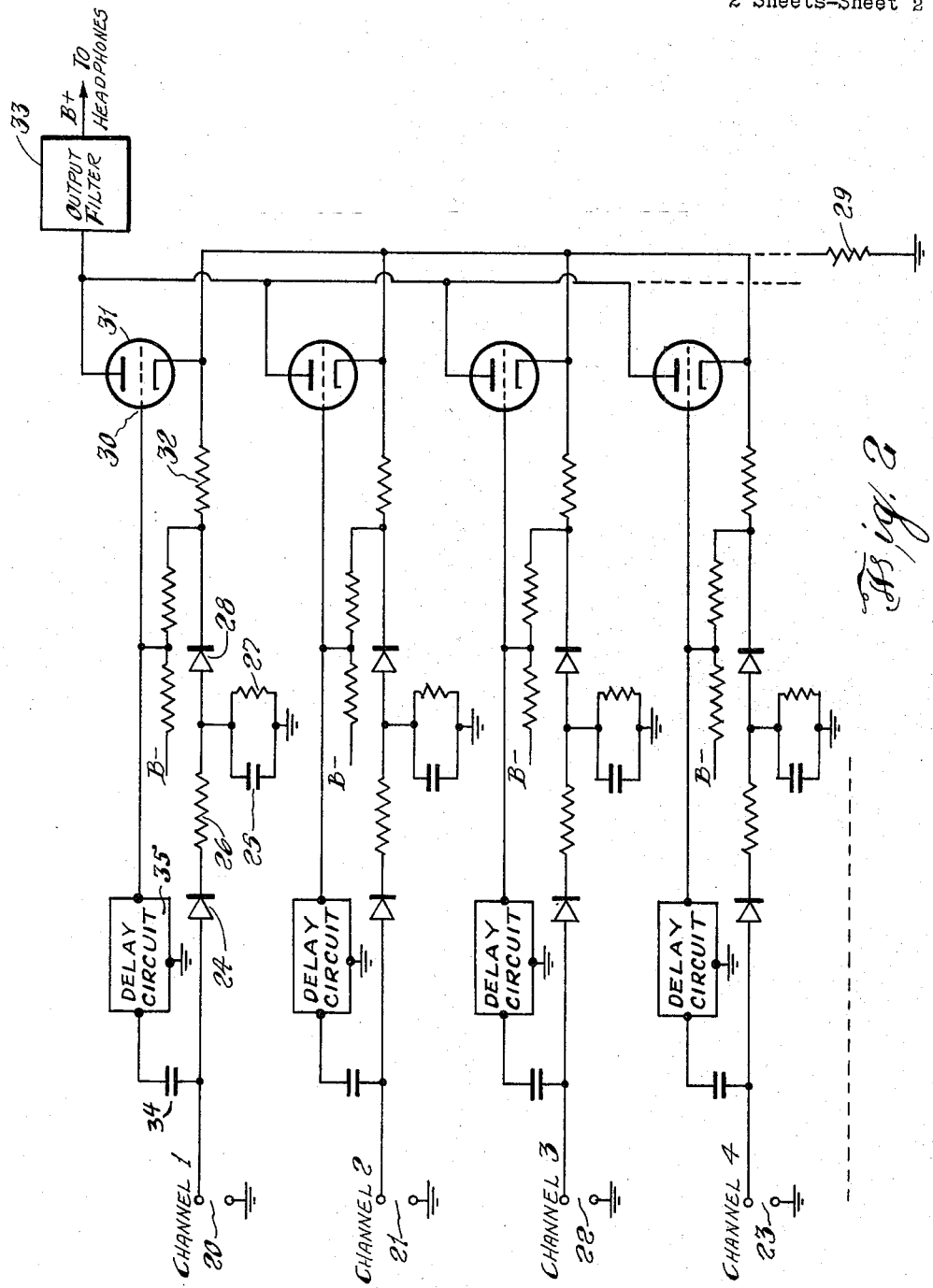

In the accompanying drawing:

FIG. 1 is a block diagram of an embodiment made in accordance with the principles of this invention; and, FIG. 2 is a schematic illustration of an aural "or" circuit for use in conjunction with the embodiment of FIG. 1.

In the illustrated embodiment of the invention of FIG. 1 an array of transducer banks 10 which are arranged in a generally circular fashion in order to permit detection in all directions therefrom. Other arrangements are possible as well as various forms and configurations of transducers all of which are quite well known to those skilled in this art. Each set or bank of transducers 10 is oriented to provide a radiation pattern as shown in which four high directional lobes 11 are oriented in different directions. Clearly there could be more or less than four lobes but for simplicity and conforming to common practice four lobes have been shown.

Since the sending pulses and the received echo signals occur at a single place but at different times the same transducer may be employed for both transmission and reception. By proper circuitry, the transducers are, for a brief interval, connected to the transmitter and the pulses transmitted. The transducers are then connected from the transmitter system and connected to the input of the receiver system. For simplicity the receiver and transmitter are designated at 12 and the connection therefrom are illustrated to the lobes 11 whereas in reality they are joined to the transducer banks. The directional characteristics of the transducers which confine the energy of the transmitted pulse along some given bearing likewise restrict the incoming echo to this same bearing. In general the transmitted pulse ranges in frequency between 5 and 40 kc. and for a duration of approximately 35 milliseconds and with heterodyning the output the receiver (beat frequency signals) results in a pair of 800 cycle tones and 1200 cycle tones on lines 13 or even all at one tone. In the ordinary operation the two outside lobes would be 1200 cycle tone and the others at 800 cycles with one of each applied to one earphone of a headset. This would permit the operator to simultaneously monitor all four channels by means of this frequency multiplexing. In this case the listening device 14 would correspond to the operator's headphones.

By interposing between the listening device and the audio output of the receiver an aural "or" circuit 15 only the signal on lines 13 of the highest amplitude will be passed on to the listening device. Under these conditions the operator monitors all the channels and through simple switching (not shown) can disable the "or" circuit 15 and listen directly to each channel. Here the operator can always hear the 800 cycle reverberation background and compare this with the highest valued echo received. This in effect makes it a simple matter to observe frequency changes in pitch (Doppler) by comparison to the background.

The circuit illustrated in FIG. 2 is an aural "or" circuit usable in the embodiment of FIG. 1. Only four channels have been shown although more or less can be used since each of the channels is identical. The outputs of the receiver circuits are applied at inputs 20–23 but reference will be made only to channel 1 wherein the 800 cycle input is rectified at diode 24 and stored on capacitor 25. Since resistors 26, 27 and capacitor 25 comprise the components which determine the charge and discharge times of the circuit their particular values can be selected to enhance and optimize incoming pulse. The rectified output of diode 24 then passes through back biasing diode 28 and builds up a voltage across output resistor 29 which is common to all the channels. Assuming for the moment that the input level at channel 1 exceeds all the other channels then the potential at the output of the back biasing diode 28 of channel 1 also exceeds all the other channels at the same location.

This, then by properly selecting B—, back biases all the diodes 28 and cuts off the signal of all the channels except channel 1. This voltage developed across resistor 29 increases in a positive sense the potential on the cathodes 30 of triodes 31 thereby reducing their amplification. However since diode 28 of channel 1 continues to conduct a voltage is developed across resistor 32 of channel 1 so as to increase the gain of triode 31 (channel 1). These two factors permit only the triode of channel 1 to pass the audio signal, to the exclusion of all the other channels, through output filter 33 to a listening device, as for example, a pair of earphones.

The audio signal path which is in parallel with the previously described aural "or" control path includes an input capacitor 34 and an audio delay circuit 35 which serves to compensate for the time constants of capacitor 25 and resistors 26, 27 so that the audio signal is synchonized with the "or" signal in the aural path at the triode. From the foregoing it is evident that the strongest signal in the plurality of channels will be passed through the triode amplifier in that channel and to the operator's earphone. Since it is desirable that the operator be provided with a reference or comparison tone the input to the other earphone could be a standard 800 cycle tone derived from the transmitter where the reverberation background is of insufficient amplitude for this purpose.

It will be understood that various changes in the details, materials and arrangements of parts (and steps), which have been herein described and illustrated in order to explain the nature of the invention, may be made by those skilled in the art within the principle and scope of the invention as expressed in the appended claims.

I claim:
1. An aural "or" circuit comprising a plurality of identical channels, each of said channels having:
 (a) a triode including cathode, grid and plate electrodes,
 (b) an "or" path having connected in series therein in the following order,
  an input terminal,
  an asymmetrically conducting element,
  charging means,
  a second asymmetrically conducting element,
  a resistance, said cathode electrode,
 (c) a signal path having connected therein in the following order, said terminal,
  (1) a capacitor,
  (2) a delay means, and
  (3) said grid electrode,
 (d) electrical conducting means connecting said plate electrodes of said triodes together,
 (e) a resistance having one end thereof connected to each of said cathode electrodes,
  whereby when a positive potential is applied to said plate electrodes and audio input signals are applied at said terminal of each of said channels the audio output signal at said plate electrode will be the largest amplitude of said input signals.
2. The circuit according to claim 1 wherein said charging means an R-C network.
3. The circuit according to claim 2 wherein said asymmetrically conducting elements are diodes.

References Cited by the Examiner
UNITED STATES PATENTS

| | | | |
|---|---|---|---|
| 2,504,884 | 4/1950 | Schock | 328—137 X |
| 2,570,431 | 10/1951 | Crosby. | |
| 2,725,467 | 11/1955 | Atwood | 328—137 X |
| 3,202,968 | 8/1965 | Eady et al. | 328—137 X |

OTHER REFERENCES

Damon, "Recording the Sonar Environment," Undersea Technology, January 1963, pp. 32–35 relied on.

CHESTER L. JUSTUS, *Primary Examiner.*

R. A. FARLEY, *Assistant Examiner.*